May 6, 1952 W. W. CUSHMAN 2,595,379
LIQUID INJECTOR FOR INTERNAL-COMBUSTION ENGINES
Filed May 4, 1950
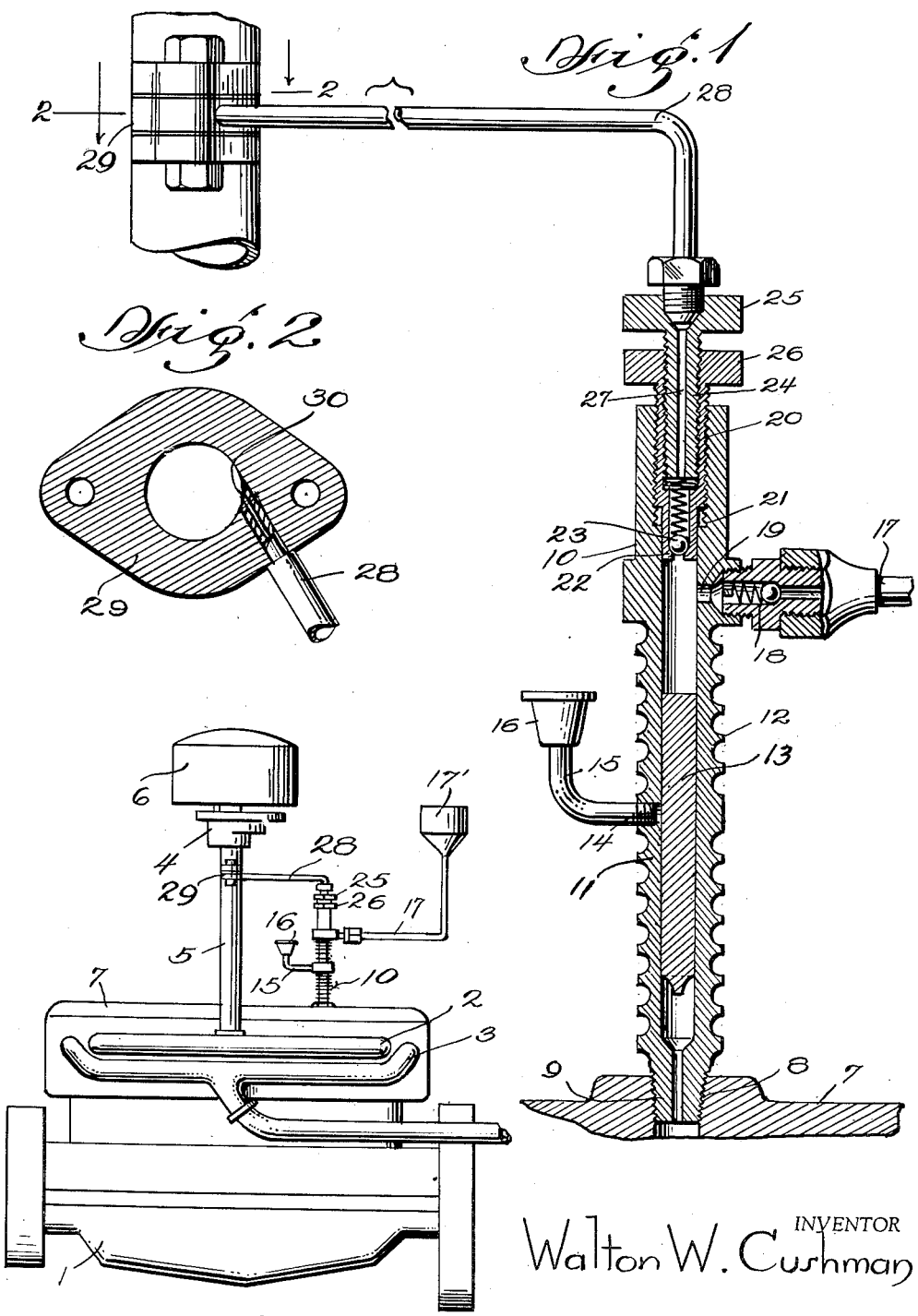
INVENTOR
Walton W. Cushman
BY
W. J. Eccleston
ATTORNEY Patented May 6, 1952

2,595,379

UNITED STATES PATENT OFFICE 2,595,379

LIQUID INJECTOR FOR INTERNAL-COMBUSTION ENGINES

Walton W. Cushman, Webb City, Mo.

Application May 4, 1950, Serial No. 159,913

13 Claims. (Cl. 123—25)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to an apparatus for incorporating liquid in the fuel entering an internal combustion engine to generally improve the operation of engines of this type.

It is well known that the proper amount of water or similar liquid incorporated in gasoline charges under certain conditions of engine load is highly desirable in reducing or eliminating detonation, economizing on gasoline consumption, maintaining proper engine temperature, etc. In all known devices of this type the injection of the water is under the control of the partial vacuum in the intake manifold so that at least some water enters the fuel line during practically the entire period of engine operation. Such methods are faulty for many reasons including the excessive use of water, as well as the use of water, at times which are actually detrimental to the efficiency of operation of the engine.

It is highly desirable in devices of this kind that the period of engine operation at which water is injected into the fuel line be varied in accordance with conditions of engine operation, etc., and also that the amount of water entering the charge be varied in accordance with such conditions.

In my application Ser. No. 8,902, filed February 17, 1948, and now Patent Number 2,586,789, issued February 26, 1952, is disclosed a liquid injector for the fuel line of an internal combustion engine, in which an aspirator is employed and is operated by pressure from the combustion chamber of one of the cylinders of the engine. Also disclosed in said application is a diaphragm pump for forcing water into the fuel charges said pump being operated by pressure from the combustion chamber of one of the engine cylinders, and the water line being provided with an adjustment by which the period of engine operation at which water is injected into the fuel line may be varied to suit varying conditions.

In my earlier application the means for varying the amount of pressure required to initiate the pumping of water into the fuel line is so located as to require that the water line be disconnected and a tool employed to make the necessary adjustment. Moreover, said earlier construction had no provision, easily accessible or otherwise, for varying the amount of water entering the fuel line at each operation of the pump.

It is an object of the present invention therefore to provide a pressure-operated pump in a water injecting apparatus wherein suitable and readily accessible adjustments permit both the time of admission of water and the quantity to be varied to suit varying conditions of engine operation.

It is also an object of the invention to provide an injector which may be adjusted to suit a variety of compression ratios as occur in the internal combustion engines of various manufacturers.

Other objects and advantages of the invention will be apparent from the following description when taken in connection with the accompanying drawings, in which Figure 1 is an enlarged sectional view through the pump and a portion of the cylinder head and showing the pipe connections in elevation;

Figure 2 is a horizontal sectional view taken on line 2—2 of Figure 1; and

Figure 3 is a side elevational view of an internal combustion engine showing the novel injection apparatus installed thereon.

More specifically, the numeral 1 indicates an internal combustion engine provided with conventional intake and exhaust manifolds 2 and 3, respectively, a downdraft carburetor 4 mounted on an intake pipe 5 and provided with the usual air cleaner 6.

The engine is provided with a cylinder head 7 in which is formed the usual compression test hole 8 and the injection apparatus, at least the lower end of its pump cylinder, is threaded therein as indicated by the numeral 9.

The pump is indicated generally by the numeral 10 and the lower portion thereof is in the form of a cylinder 11 provided with external cooling fins 12 and a freely movable piston 13. One wall of the cylinder 11 is preferably provided with an opening 14 into which is threaded the pipe portion 15 of an oil cup 16 to provide for properly lubricating the interior of the cylinder.

Attached to the cylinder wall 11 adjacent the upper end thereof is one branch of a water pipe 17 leading from a water supply such as container 17. Interposed between the pipe 17 and the cylinder wall is a ball-type check-valve 18, and water is admitted into the interior of the cylinder through a passage 19.

Threaded into the upper end of the pump casing 10 is a sleeve 20 having a reduced portion 21 at its lower end which is closed except for an aperture 22 which serves to permit the passage of water into the interior of the sleeve. Mounted in the interior of this reduced portion 21 of the sleeve 20 is a spring-pressed pressure-relief valve 23, and in order to vary the pressure on this spring and consequently regulate the amount of pressure required to open the valve, a plug 24 is threaded into the sleeve 20; this plug, as well as the sleeve 20, being each provided with an exterior knurled portion 25 and 26, respectively, whereby the longitudinal positions of these elements with respect to the pump casing may be adjusted. The threaded plug 24 is formed with a longitudinal passageway 27 whereby water forced from the cylinder 11 past the pressure-relief valve 23 may pass into a pipe 28 which is connected at one end to the interior of the plug 24 and at its opposite end to an adapter washer 29 which is mounted between two sections of the induction pipe 5 leading to the intake manifold 2 of the engine. The adapter is provided with an orifice 30 of small diameter leading to the interior thereof. It will be noted that the pipe 28 is disposed more or less tangentially to the interior of the adapter 29 thereby serving to impart a whirling action to the charge of water entering the suction side of the engine and breaking it down into particles to form a vapor or fog as the mixture is mixed with the air and/or fuel mixture passing to the intake manifold. While the pipe 28 is illustrated as connected to the pipe 5, it may be connected to either end of the manifold 2 or with the air inlet to the carburetor, as preferred.

By the construction of the sleeve 20 and plug 24 in the upper end of the cylinder pump casing 10, and the formation of the pressure-relief valve as a part of the sleeve 20, the length of stroke of the piston 13 may be readily varied by merely rotating the knob 26 in the proper direction to raise or lower the sleeve 20 and with it the necked-in portion 21 of the sleeve which serves as a stop or upper limit for the piston. Likewise, by rotating the knob 25 of the plug 24 the latter may be raised or lowered with respect to the ball-pressure release-valve 23, thereby varying the degree of compression on its spring.

In the operation of the device the pressure formed in the combustion chamber at any particular period of operation will be passed through the opening in the lower end of cylinder 11 into the interior thereof and against the lower end of the piston 13. Should the power of the engine be sufficiently great, at the particular time, the piston 13 will be forced upwardly so as to force the water, which has previously been drawn into the cylinder, and past check-valves 18 against the pressure-relief valve 23 with sufficient force to raise the latter and force a charge of water into the passage 27 of plug 24 and then into pipe 28. If the engine is developing sufficient power, this action of the pump cylinder is repeated so as to rapidly fill the pipe 28 and force charges of water into the suction line of the engine, so as to facilitate and improve its operation in a manner which will be readily understood. However, if the engine is working under conditions such that the addition of water or mixture to the charges would not enhance its operation, the pressures within the combustion chamber would be sufficiently low as to preclude the opening of the pressure-relief valve 23, assuming, of course, that the spring pressure on this valve has been properly adjusted at the time the injector apparatus is installed on the engine. As already stated, this adjustment of the pressure-release valve and the length of stroke of the piston may be suitably accomplished by rotating in the proper direction the knurled knobs 25 and 26 of the plug 24 and sleeve 20 respectively.

After the apparatus is installed on an internal combustion engine the knob 25 should be rotated in a direction to lower the plug 24 until the first detonation occurs, thereafter the knob 25 should be rotated in a reverse direction for approximately one complete turn. By this adjustment the length of stroke of the piston is regulated. In order to control the volume of water entering the induction system the engine should be operated at full throttle and at a low R. P. M. and knob 26 rotated so as to increase the pressure on the spring of the pressure-relief valve until detonation takes place; thereafter the knob 26 is rotated in a reverse direction until detonation ceases. This more or less empirical method of adjusting the apparatus is due to the fact that more liquid is required in an engine having higher compression ratios and also for those employing low octane fuels. Hence, no set rules can be followed for making the proper adjustments for the pressures at which the apparatus is to be activated and for the amount of water to enter the charges, other than by performance observations.

It will be apparent to those skilled in the art that by reason of the novel construction disclosed herein, the injection of water into the fuel charges will take place only at higher pressures when it is most needed for improvement of engine operation, that the operation of the attachment is directly responsive to the pressures formed in the combustion chamber, and that the apparatus is easily adjustable by mere rotation in the proper direction of the two narrow knobs to modify its action to varying compression rates, as well as to fuels of high or low octane value.

While one specific form of water injector has been illustrated and described in great detail, it will be obvious that various changes may be made in structure details without departing from the spirit of the invention, and it is intended that all such changes be included within the scope of the appended claims.

I claim:

1. A water injector for internal combustion engines comprising a water container, a pipe leading therefrom to the induction system of the engine, and a pressure-operated pump connected with said pipe, said pump including a cylinder having one end in communication with a combustion chamber of the engine and the opposite end communicating with the interior of the pipe, and a piston in said cylinder.

2. A water injector for internal combustion engines comprising a water container, a pipe leading therefrom to the induction system of the engine, and a pressure-operated pump connected with said pipe, said pump including a cylinder having one end in communication with a combustion chamber of the engine and the opposite end communicating with the interior of the pipe, a piston in said cylinder, and means for varying the length of stroke of the piston.

3. A water injector for internal combustion engines comprising a water container, a pipe leading therefrom to the induction system of the engine, and a pressure-operated pump connected with said pipe, said pump including a cylinder having one end in communication with a combustion chamber of the engine and the opposite end communicating with the interior of the pipe, a piston in said cylinder, a spring-pressed pressure-relief valve in said pump, and means for varying the pressure on the spring.

4. A water injector for internal combustion engines comprising a water container, a pipe leading therefrom to the induction system of the engine, and a pressure-operated pump connected with said pipe, said pump including a cylinder having one end in communication with a combustion chamber of the engine and the opposite end communicating with the interior of the pipe, a freely movable piston in said cylinder, and means for varying the length of stroke of the piston.

5. A water injector for internal combustion engines comprising a water container, a pipe leading therefrom to the induction system of the engine, and a pressure-operated pump conected with said pipe, said pump including a cylinder having one end in communication with a combustion chamber of the engine and the opposite end communicating with the interior of the pipe, a piston in said cylinder, and adjusting means on said pump for varying the length of stroke of the piston and the amount of pressure required to operate the pump.

6. A water injector for internal combustion engines comprising a water container, a pipe leading therefrom to the induction system of the engine, a pressure-operated pump connected with said pipe, said pump including a cylinder in communication with a combustion chamber of the engine and the pipe, a piston in said cylinder, a check valve and a pressure-relief valve in said pump, and means for varying the length of stroke of the piston.

7. A water injector for internal combustion engines comprising a water container, a pipe leading therefrom to the induction system of the engine, a pressure-operated pump connected with said pipe, said pump including a cylinder in communication with a combustion chamber of the engine and the pipe, a piston in said cylinder, a check valve and a spring-pressed pressure-relief valve in said pump, and means extending exteriorly of the pump for varying the pressure on said spring.

8. A water injector for internal combustion engines comprising a water container, a pipe leading therefrom to the induction system of the engine, a pressure-operated pump including a cylinder in communication with a combustion chamber of the engine and the pipe, a piston in said cylinder, a check valve and a spring-pressed relief valve in said pump, and means extending exteriorly of the pump for varying the length of stroke of the piston.

9. A water injector for internal combustion engines, including a cylinder and imperforate piston exposed to the pressures of a combustion chamber and a spring-pressed pressure-relief valve, a plug provided with a longitudinal passageway and threaded into the head of the cylinder for varying the pressure on the spring.

10. A water injector for internal combustion engines, including a cylinder and imperforate piston exposed to the pressures of a combustion chamber and a pressure-relief valve, a sleeve threaded into the head of the cylinder for varying the length of stroke of the piston.

11. A water injector for internal combustion engines, including a cylinder and imperforate piston exposed to the pressures of a combustion chamber and a spring-pressed pressure-relief valve, a sleeve threaded into the head of the cylinder for varying the length of stroke of the piston, and a plug provided with a longitudinal passageway and threaded into said sleeve for varying the pressure on the spring of the relief valve.

12. A water injector for internal combustion engines comprising a pressure-operated pump including a cylinder and piston exposed to the pressures in a combustion chamber of the engine, a spring-pressed pressure-relief valve in the head of the cylinder, a water pipe communicating with the interior of the cylinder through one side thereof, a check valve is said pipe, and a second water pipe leading from the head of the cylinder to the induction system of the engine.

13. A water injector for internal combustion engines comprising a pressure-operated pump including a cylinder and piston exposed to the pressures in a combustion chamber of the engine, a spring-pressed pressure-relief valve in the head of the cylinder, a water pipe communicating with the interior of the cylinder through one side thereof, a check valve in said pipe, a second water pipe leading from the head of the cylinder to the induction system of the engine, and means for varying the length of stroke of the piston.

WALTON W. CUSHMAN.

REFERENCES CITED

The following references are of record in the file of this patent:

UNITED STATES PATENTS

| Number | Name | Date |
| --- | --- | --- |
| 1,398,667 | Beals | Nov. 29, 1921 |
| 1,528,665 | Fischer | Mar. 3, 1925 |